(12) United States Patent
Spiegel et al.

(10) Patent No.: US 10,838,931 B1
(45) Date of Patent: Nov. 17, 2020

(54) USE OF STREAM-ORIENTED LOG DATA STRUCTURE FOR FULL-TEXT SEARCH ORIENTED INVERTED INDEX METADATA

(71) Applicant: EMC IP Holding Company LLC, Hopkinton, MA (US)

(72) Inventors: Aaron W. Spiegel, Stilwell, KS (US); Stephen G. Graham, Chapel Hill, NC (US); Paul R Kingston, Cumming, GA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 230 days.

(21) Appl. No.: 15/581,665

(22) Filed: Apr. 28, 2017

(51) Int. Cl.
*G06F 16/215* (2019.01)
*G06F 16/25* (2019.01)
*G06F 16/31* (2019.01)
*G06F 16/22* (2019.01)

(52) U.S. Cl.
CPC ........ *G06F 16/215* (2019.01); *G06F 16/2228* (2019.01); *G06F 16/258* (2019.01); *G06F 16/31* (2019.01)

(58) Field of Classification Search
CPC .... G06F 16/215; G06F 16/2228; G06F 16/31; G06F 16/258
See application file for complete search history.

(56) References Cited

U.S. PATENT DOCUMENTS

| | | | | |
|---|---|---|---|---|
| 5,913,209 A * | 6/1999 | Millett | ..................... | H03M 7/30 |
| 2008/0215546 A1* | 9/2008 | Baum | ................. | G06F 16/2272 |
| 2013/0103657 A1* | 4/2013 | Ikawa | ............... | G06F 16/90344 |
| | | | | 707/693 |
| 2014/0032568 A1* | 1/2014 | Leko | ..................... | G06F 16/322 |
| | | | | 707/743 |
| 2015/0347516 A1* | 12/2015 | Kobayashi | ........ | G06F 16/24568 |
| | | | | 707/610 |
| 2017/0139996 A1* | 5/2017 | Marquardt | ............ | G06F 16/221 |

* cited by examiner

*Primary Examiner* — Robert W Beausoliel, Jr.
*Assistant Examiner* — Mohammad Solaiman Bhuyan
(74) *Attorney, Agent, or Firm* — Womble Bond Dickinson (US) LLP

(57) ABSTRACT

Systems and methods are disclosed for efficiently indexing stream data to facilitate full-text search of the stream data. A stream comprises a plurality of intervals of log data records. An interval of log data records are indexed. The index and log data records for the interval are written to an indexed stream data file. The index for each interval contains pointers to the terms in the log data records for the interval. After a number of intervals of index and log data records have been written, a merge operation can merge the number of intervals of index into a single merged index. The merged index and intervals of log data records are written to the indexed data stream file. A full-text search index is generated by traversing and merging the interval indexes for the data stream.

18 Claims, 8 Drawing Sheets

USE OF STREAM-ORIENTED LOG DATA STRUCTURE FOR FULL-TEXT SEARCH ORIENTED INVERTED INDEX METADATA

TECHNICAL FIELD

This disclosure relates to the field of efficiently indexing streams of data and generating a full-text search index in response to a database query.

BACKGROUND

A stream is a sequence of data elements made available over time. A video stream, for example, can comprise a sequence of video data elements made available to a device for viewing the video in an ordered, time-sequenced manner. A client device can request one or more streams from one or more sources. A video stream with an audio stream, for example, may be requested by a client device. The client device then processes the one or more streams as separate streams.

It is desirable to be able to query stream data using a full-text search. Prior art solutions to indexing a data stream, and generating a full-text search index from the indexed data stream, will replicate the raw stream data before indexing it, then generate an index for each copy of the replicated raw stream data, thereby generating an indexed version of the raw stream data. Indexing each replica of raw data generates a substantial number of input/output (I/O) operations and consumes substantial memory and processing resources. Each replica of raw data for a stream may be 100 megabytes (MB), or more, before indexing. For a replica factor of 3, the prior art would separately index 3 copies of the raw data to produce 3 indexes. The stream data index file contains a compressed version of the raw stream data. Each index can be as big or bigger than the raw stream data file used to generate the index. Thus, for a replication factor of 3, there would be approximately 6 times the amount of data for a stream as was originally generated for the raw stream data file.

The prior art maintains a separate index file and raw data file, for each indexed stream, increasing the complexity of stream and index data maintenance. To delete data associated with a stream, an administrator must remember to delete all replicas of the raw data of a stream and all replicas of the index for the stream. Deleting just the index still leaves the raw data in place. Deleting just the raw data leaves an index with no supporting raw data.

In the prior art, an indexed stream data file contains an index for every interval of data records in the stream data file. A common interval is 1 second of data. Thus, the number of interval indexes in an indexed stream data file is very large and can be difficult to traverse in a stream file based on the number of I/Os needed to traverse the numerous interval indexes. The prior art does not provide consolidation of interval indexes, to reduce the number of indexes in an indexed data stream file.

Prior art systems for generating a full-text search index of stream data are inefficient, using substantial storage, memory, and computational resources to implement. Prior art systems for generating a full-text search of stream data index are also difficult to maintain.

BRIEF DESCRIPTION OF THE DRAWINGS

Embodiments of the invention are illustrated by way of example, and not by way of limitation, in the figures of the accompanying drawings in which like reference numerals refer to similar elements.

In the following description of the figures, the inventive concepts herein have been described with respect to generate indexes for a stream of data, and to use those indexes to generate a full-text search index in a streaming service comprising a cluster of nodes. However, the disclosure is not to be construed as limited to a cluster of nodes. A single server can perform the operations described herein.

DETAILED DESCRIPTION

Figure 1:
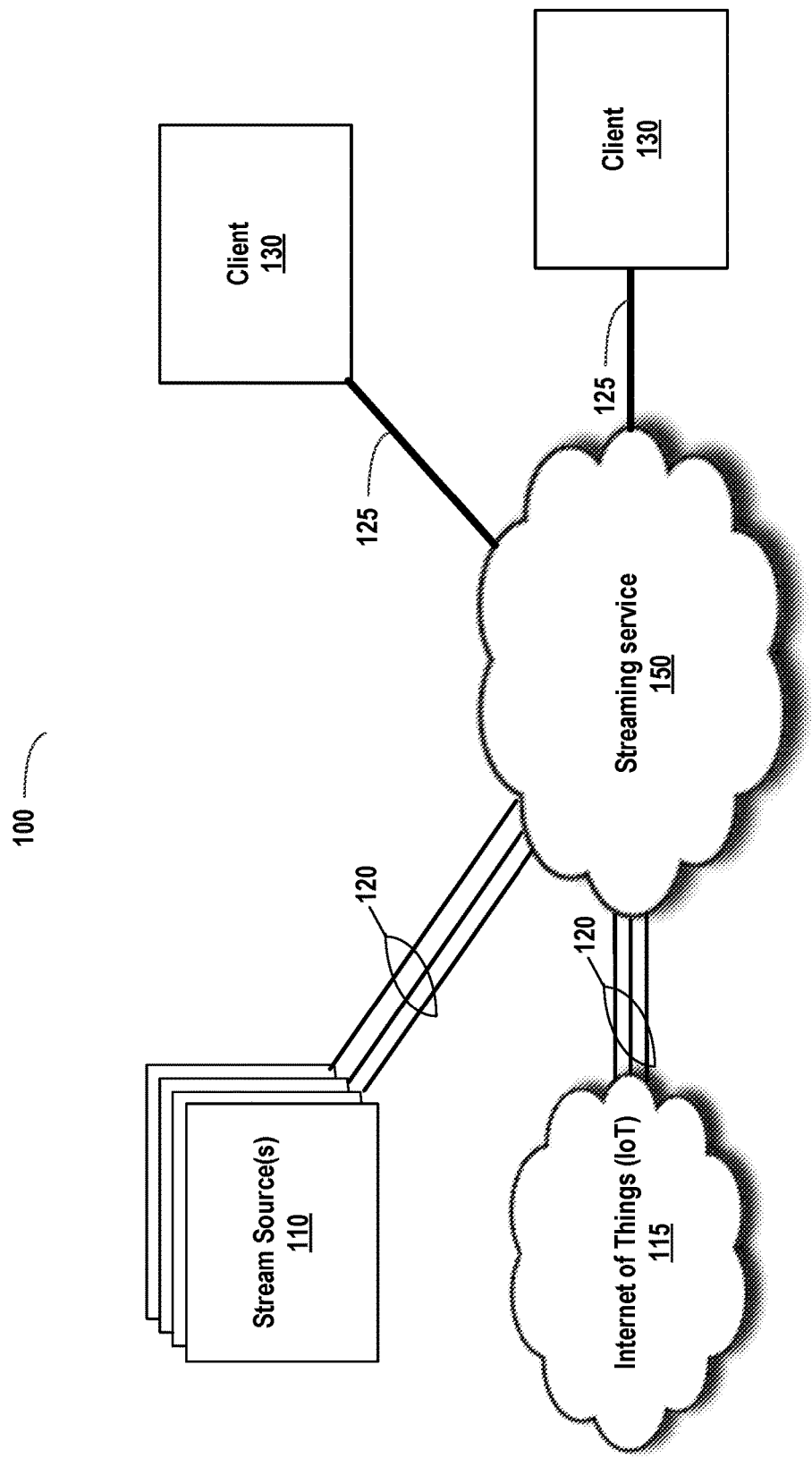
FIG. 1 illustrates, in block diagram form, an overview of an infrastructure for efficiently indexing a data stream and generating a full-text search index from the indexed data stream, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for a server performing efficient generation of a full-text search index for a data stream of records. For each of a plurality of intervals of time, a plurality of data stream records are received. An index of terms for the plurality of data stream records for the interval is generated, and the index and the plurality of records are written to an indexed data stream file. The full-text search index for the data stream can be generated by merging the interval indexes in the indexed data stream file. In an embodiment, the data stream can be indexed in response to a database query. In an embodiment, the database query can include a database action, such as search, update, delete, or read. In an embodiment, the indexed terms for each interval are referenced, e.g., with pointers to the data stream records that contain the terms of the index. In an embodiment, after a predetermined merge threshold number of intervals have been indexed and written to the index stream data file, the interval indexes can be merged into a single merged index. The merged index can be written to the indexed stream data file. The plurality of records for the intervals of the predetermined number of intervals are also written to the indexed stream data file. In an embodiment, the interval indexes and intervals records used to generate the merged index and merged intervals can be marked for deletion.

Any of the methods described herein can be embodied on a non-transitory computer-readable medium programmed with executable instructions that, when executed, perform the method. A system can be programmed with executable instructions that, when executed by a processing system, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 is a block diagram illustrating an overview of an infrastructure 100 for efficiently indexing a data stream and generating a full-text search index from the indexed data stream, in accordance with some embodiments. Streams that are declared to be searchable within the streaming service 150 can be indexed on ingestion into the streaming service 150.

A streaming service 150 can receive streams 120 from stream sources 110 and from, e.g. Internet of Things (IoT) 115. Streaming service 150 can be implemented as a cluster having a plurality of nodes. Each of the plurality of nodes can comprise a computing device, such as is described with reference to FIG. 7, below. Stream sources 110, IoT 115, streaming service 150, and client devices 130 can communicate via network connections (not shown). As defined above, a stream is a sequence of data elements or records made available over time. A stream source can include, but is not limited to, a video or audio stream, an output stream from a computing device such as backup data or computer operation status statistics, data output from a sensor or collection of sensors such as heat, light, temperature, and door sensors, alarms systems, position or vehicle status data (e.g. smog emissions data, engine temperature, battery charge, speed information) from an automated driving, or conventional, vehicle, a radio stream, including data streamed from a cell phone, smart phone, or other personal digital device. A stream 120 can include data elements output from a network of devices (Internet of Things 115), such as devices from a home, business, or a manufacturing facility, including one or more appliance or machinery status outputs, lighting controls status outputs, alarm system monitoring outputs, video surveillance data, and numerous other data sources.

Streaming service 150 can receive data streams 120 and provision a session for each data stream 120. Provisioning can include allocating memory and processor resources, and storage for the receipt, buffering, storage, processing, indexing, and transmission of data received from the data stream 120. Streaming service 150 can generate an entry in a stream database 181 identifying the data stream 120, including a handle or unique identifier and a set of routing keys, and attributes generated from data and/or metadata of the data stream 120. In an embodiment, stream data base 181 can include a security component that enforces which users are authorized to read from a stream 120. Streaming service 150 can receive records from data stream 120 for a period of time, then generate an index for the records, and write the generated index and records to an indexed stream data file 185. The generated index can be self-referential, i.e., the index of terms for the interval can refer, e.g. by pointer, to terms in the received records for the interval. The self-referential indexed stream data file 185 is efficient; the indexed data stream saves space over having separate index and stream data files of the prior art. In addition, the indexed stream data file 185 facilitates maintenance of stream data. Deleting the indexed stream data file 185 also deletes the index data within the indexed stream data file 185.

In an embodiment, streaming service 150 can generate a full-text search index 190 from indexed stream data file 185 over a plurality of intervals of time. In an embodiment, the full-text search index 190 can be in an inverted index. The streaming service 150 can read log file data records for each of a plurality of intervals of records from the data stream 120, then generate an index for the terms in the log file data records in each interval in the plurality of intervals. Indexer 160 can then write the index and log file data records for each interval in the plurality of intervals to indexed stream data file 185. In an embodiment, streaming service 150 can generate the full-text search index 190 in response to a query against the indexed stream data file 185.

A client device 130 can query stream data of the streaming service 150. The query can specify an index for an active data stream 120 that is currently generating log data records, or an indexed stream data file 185. A query can also specify a start interval and end interval of data for the query, and a database action to perform on the results that satisfy the query. A data base action can include search, update, delete, or read operations. A client 130 can be any type of computing device such as a personal computer (e.g., desktops, laptops, and tablets), a workstation, a handheld device, a Web-enabled appliance, a gaming device, a media player, a mobile phone (e.g., Smartphone), a virtual machine, a virtual machine host, a server, or any computing system operable to communicate over a storage area network. An exemplary client device 130 is described below with reference to FIG. 7.

Figure 2A:
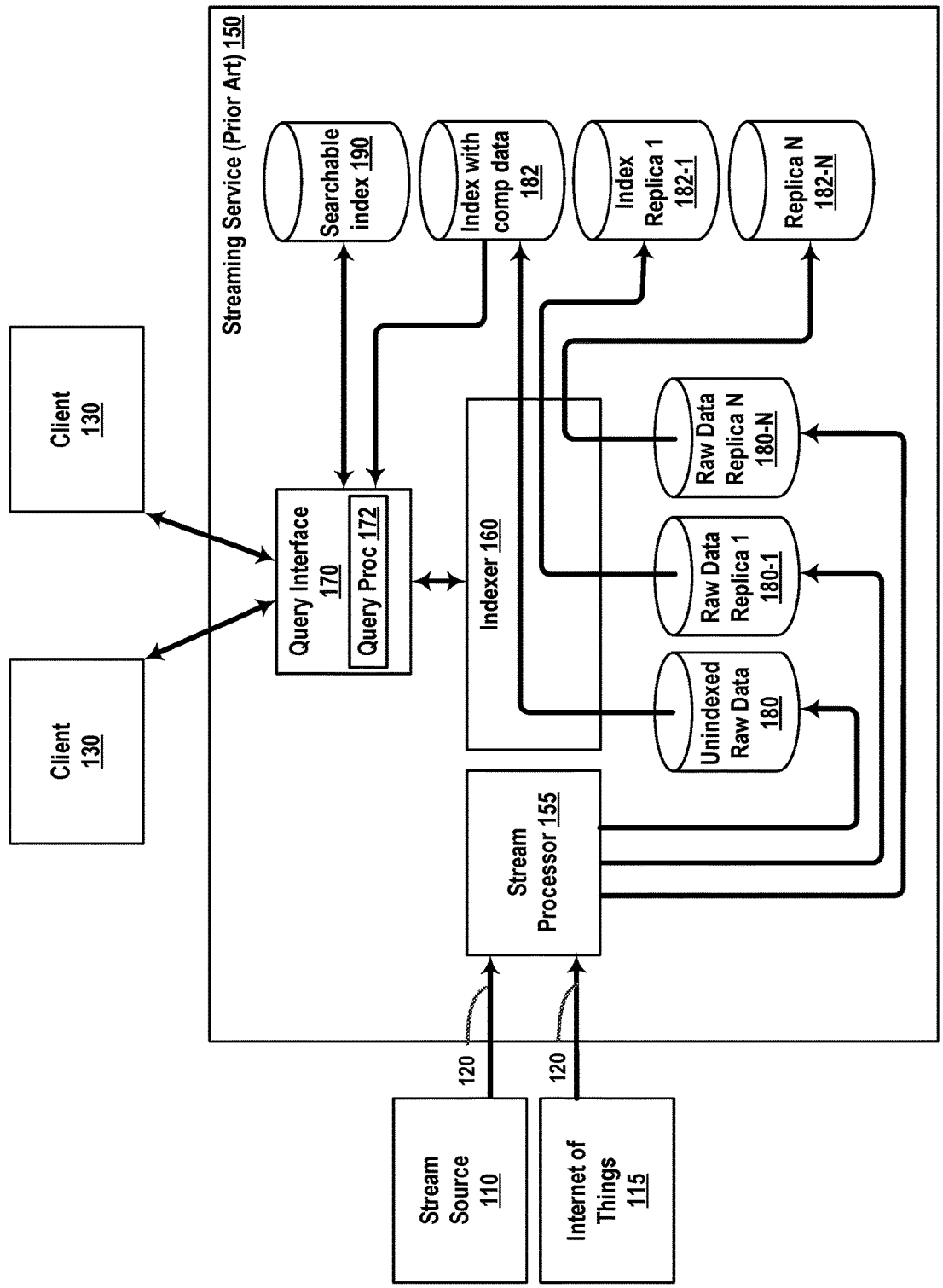
FIG. 2A illustrates, in block diagram form, a detailed view of an infrastructure for indexing a data stream in the prior art.

FIG. 2A illustrates, in block diagram form, a detailed view of an infrastructure 100 for indexing a data stream in the prior art.

In the prior art, a stream processor 155 can receive stream data 120 from stream sources 110 and/or internet of things (IoT) 115. Stream processor 155 generates an unindexed raw stream data file 180 from the data stream 120, and further replicates the unindexed raw stream data file 180 "N" number of times across a plurality of nodes of the stream service 150 cluster. In the prior art, an indexer 160 reads an unindexed raw stream data file 180 and generates an index file 182 for the raw stream data file 180. Each data stream index 182 in the prior art includes the index and a compressed version of the raw data used to generate the data stream index 182. The indexing process 160 is repeated for each copy of the unindexed raw stream data files 180-1 through 180-N, separately generating data stream index files 182-1 through 182-N across the plurality of nodes of the stream service 150 cluster. The repeated indexing process for each of the unindexed raw stream data 180 replicas in the prior art generates a substantial number of input/output operations and consumes substantial processing resources. Stream service 150 of the prior art then retains the unindexed raw stream data files 180 through 180-N and the index files 182 through 182-N, utilizing substantial storage resources. In the prior art, if N is, e.g., 3 then the stream service 150 of the prior art stores 3 copies of the unindexed raw data file 180 and 3 copies of the index 182, thereby generating approximately six copies of the raw data within the system.

Streaming service 150 of the prior art can also include a query interface 170 to receive queries from clients 130. Query processor 172 of the prior art can read a copy of the indexed stream data 182, and generate a full-text search index 190. Query processor 172 of the prior art can use the full-text search index 190 to retrieve results responsive the client query.

Figure 2B:
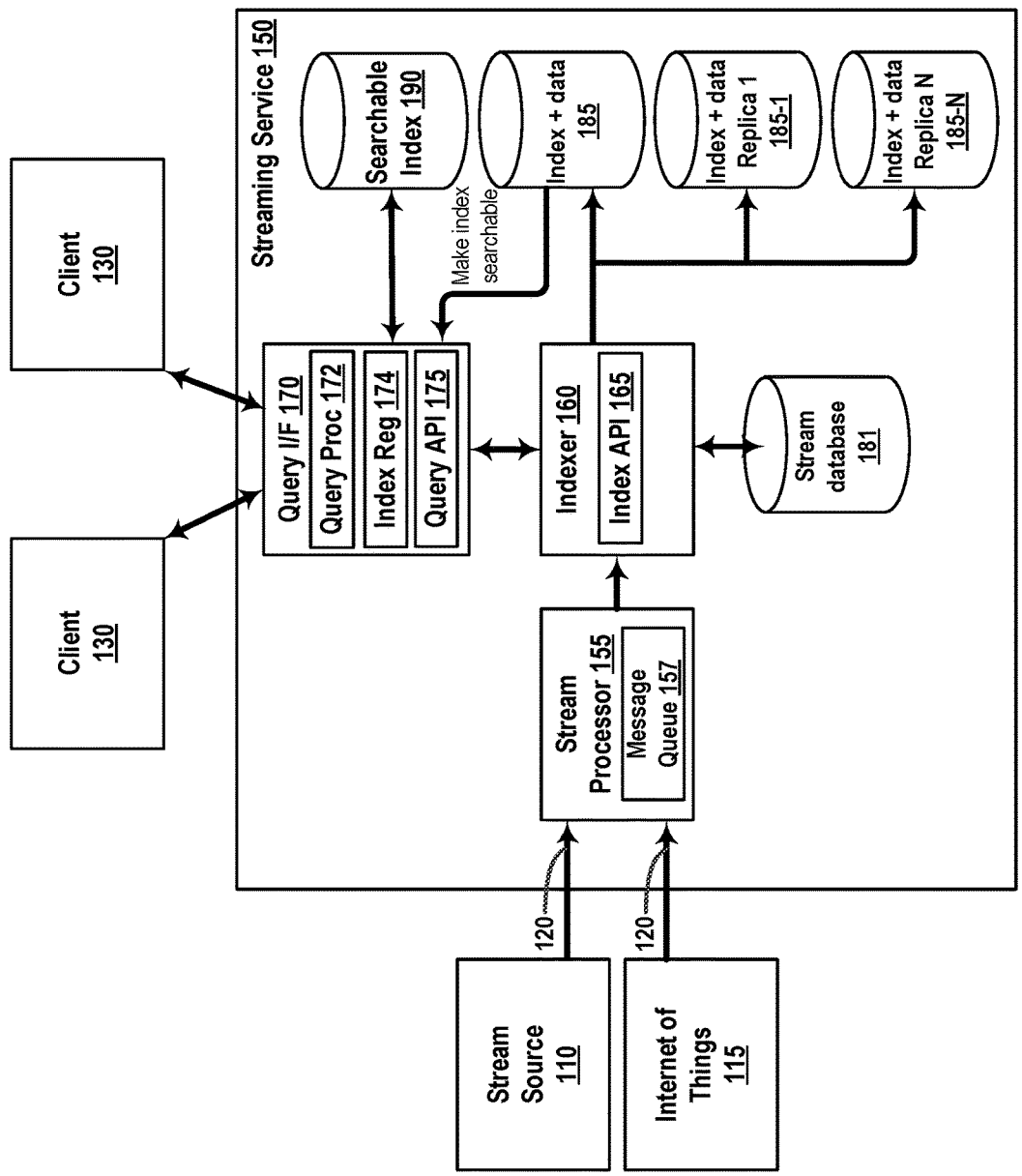
FIG. 2B illustrates, in block diagram form, a detailed view of an infrastructure for efficiently indexing a data stream and generating a full-text search index from the indexed data stream, in accordance with some embodiments described herein.

FIG. 2B illustrates, in block diagram form, a detailed view of an infrastructure 100 for efficiently indexing a data stream and generating a full-text search index 190 from the indexed data stream 185, in accordance with some embodiments. Streaming service 150 can be implemented across a cluster of nodes, each node comprising a computing device, such as described with reference to FIG. 7, below. Streaming service 150 can include a stream processor 155, indexer 160, and query interface 170. Clients 130 can submit queries against indexes for stream data 120 and indexed stream data 185. Query processor 170 and query API 175 can be used to generate a full-text search index 190 of the stream data specified within the query received from the client device 130.

Stream processor 155 can receive data streams 120 from stream sources 110 and/or Internet of Things (IoT) 115. Stream processor 155 can generate a message queue 157 for processing each data stream 120. The data stream 120 can include metadata describing attributes of the data stream 120, such as a make/model of the device generating the data, a location of the device generating the data, an owner of the device generating the data, a type of the data (binary, text, etc.), uses for the data, content of the data, and the like. The message queue 157 can receive raw data from stream 120 and generate log file data records for indexing and storage in an indexed stream data file 185. Indexer 160 can store a record of each received stream 120, including metadata about the stream. Metadata about the stream 120 can include how many replicas of indexed stream data file 185 may have been generated, the nodes on which the replicas are stored, whether the stream has been indexed, identifiers of the stream, and the like.

Indexer 160 can generate an indexed stream data file 185 for a stream that is declared searchable within the streaming service 150. An entry in stream database 181 can indicate that a stream is declared searchable within the streaming service 150. Indexer 160 can receive a plurality of stream log file records over a predetermined interval of time from stream data 120. Indexer 160 can generate an index of the terms in the received plurality of stream log file records. In an embodiment, the index of terms for the plurality of stream log file records over the interval can be an inverted index. The index of terms, and the log file records used to generate the index of terms for the interval of time, can be written to indexed stream data file 185. The receiving of stream data log file records, indexing, and writing can be repeated for any number of intervals of time. In an embodiment, the time interval can be 1 second.

Data and indexes can be dynamically scaled by merging a predetermined number of intervals of index and log data records. During the process of generating the indexed stream data file 185, indexer 160 can track the number of intervals index and plurality of log data records that have been written to the indexed stream data file 185. When the number of such intervals exceeds a threshold, such as 10 intervals, then indexer 160 can merge the indexes of the threshold number of intervals, and write to the index stream data file 185 a merged index and the plurality of intervals of data, each having a plurality of log data records. Once merged, the previously written index and log data records for the plurality of intervals can be marked for deletion. In an embodiment, the indexes for the plurality of intervals can be merged using mergesort, quicksort, B-Tree, binary tree, or other indexing method. In an embodiment wherein the intervals are each 1 second in during, and the threshold for merging is 10 intervals, the merged index and data records interval will then be 10 seconds of stream data. Merging can be iterative. If indexer 160 has merged a threshold number of intervals, for a second threshold number of times, then the merged indexes may be merged into a larger merged index for the second threshold number of merged indexes. Indexer 160 can write the larger merged index, and the plurality of merged intervals of log data records, to indexed stream data file 185. Indexer 160 can then mark for deletion the merged indexes and plurality of intervals of log data records used to generate the larger merged index and plurality of merged intervals of log data records. In an embodiment, the first and second merge thresholds can both be 10, such that a first merge generates 10 seconds of index and log data records and a second, larger merge generates 100 seconds of index and log data records.

After indexer 160 generates an indexed stream data file 185, indexer 160 can cause "N" replicas of the indexed stream data file 185 to be generated across nodes of the streaming service cluster. An indexed stream data file 185 can be registered with index register 174 of the query interface 170 so that query processor 172 can quickly determine, without a call to indexer API 165, that a stream has been indexed. Index register 174 can store information that associates a stream identifier with the indexed data stream 185 filename associated with the stream.

When query interface 170 receives a query from a client device 130, query interface 170 can call query processor 172 to determine the indexes for the streams 120 specified in the query. Query processor 172 can parse the query to determine the streams specified in the query, a time range for the stream data, search terms, and a database action to be performed on the resulting stream data that matches the query. A database action can be, e.g., search, update, delete or read database records. Query processor 172 can call query API 175 to request service from indexer 160. Indexer 160 can receive the service request from query API 175 and access stream database 181 to determine information about the requested stream(s). Information about the requested streams can include whether the requested stream data 120 is currently generating new log data records on the streaming service 150 or the requested stream is stored as an indexed stream data file 185. If any streams specified in the query are not declared as searchable, and thus do not have a indexed stream data file 185, then indexer API 165 can return a notification to the query API 175 that one or more streams indicated in the query are not searchable within the streaming service 150. If any of the streams requested in the query do not yet have an indexed stream data file 185, then indexer 160 can call indexer API 165 to generate an indexed stream data file 185 for the requested stream. Indexer API 165 can return, to calling query API 175, a notification that all streams specified in the query now have a corresponding indexed stream data file 185. The notification can further include an identifier of the indexed stream data file 185 corresponding to each data stream specified in the query, and specified in the query API 175 call to the indexer 160.

When query API 175 receives the notification from indexer 160 that all streams satisfying the query have a corresponding indexed stream data file 185, then query processor 172 or query API 175 can read the index stream data file 185 for each stream specified in the client 130 query, and generate a full-text search index 190 for the query. In an embodiment, the full-text search index 190 can be an inverted index. Query processor 172 can then use the full-text search index 190 to determine terms and data records that match the client 130 query, and retrieve the records from the indexed stream data 185 files for the stream. Query interface 170 can then return the records as query results to the client 130, or otherwise perform the database action. In an embodiment, when the database action is "search," the query interface 170 returns the query results to the client 130. In an embodiment, when the database action is "delete," the selected records matching the query are marked for deletion. In an embodiment, when the client 130 query specifies that the database action is "update," then the records matching the query are updated as specified in the query.

Query interface 170 can generate a full-text search index for the streams referenced in the client 130 query, over the time interval specified in the query. Generating a full-text search index 190 for a specified data stream can include traversing the corresponding index stream data file 185 to generate the full-text search index 190 for the stream. Traversing an indexed stream data file 185 for a specified time interval can include determining a starting interval and an ending interval of time for the query. Query processor 172 can read the index at the starting time interval. A table at the starting time interval, or at the start of the indexed stream data file 185, can include a table that points to the index of the next interval in the indexed stream of data 185. The index at the next interval can be merged with the index from the previous interval to generate the full-text search index 190. A table at the index of this next interval can point to the index of the next interval in the data stream index 185. The process of traversal and merging of interval indexes can continue until the ending interval in the query has been reached and the index at the interval has been merged with the full-text search index 190 for the indexed stream of data 185. The full-text search index 190 for a stream can include pointers to terms and to stream log data records in the indexed stream data file 185. Query processor 172 can use the full-text search index 190 to directly access the terms and stream log records for satisfying the query. In an embodiment, query processor 172 can merge the full-text search index 190 for all streams specified in the query, and determine terms and stream log data records that match the query from the merged full-text search index 190. Since the full-text search index 190 for all streams specified in the query is built from indexes in the indexed stream data files 185, and the indexes at the intervals of the indexed stream data files 185 contain pointers to the log data records for the interval, the full-text search index 190 can be used to directly read data records from the corresponding indexed stream data file 185.

Figure 3:
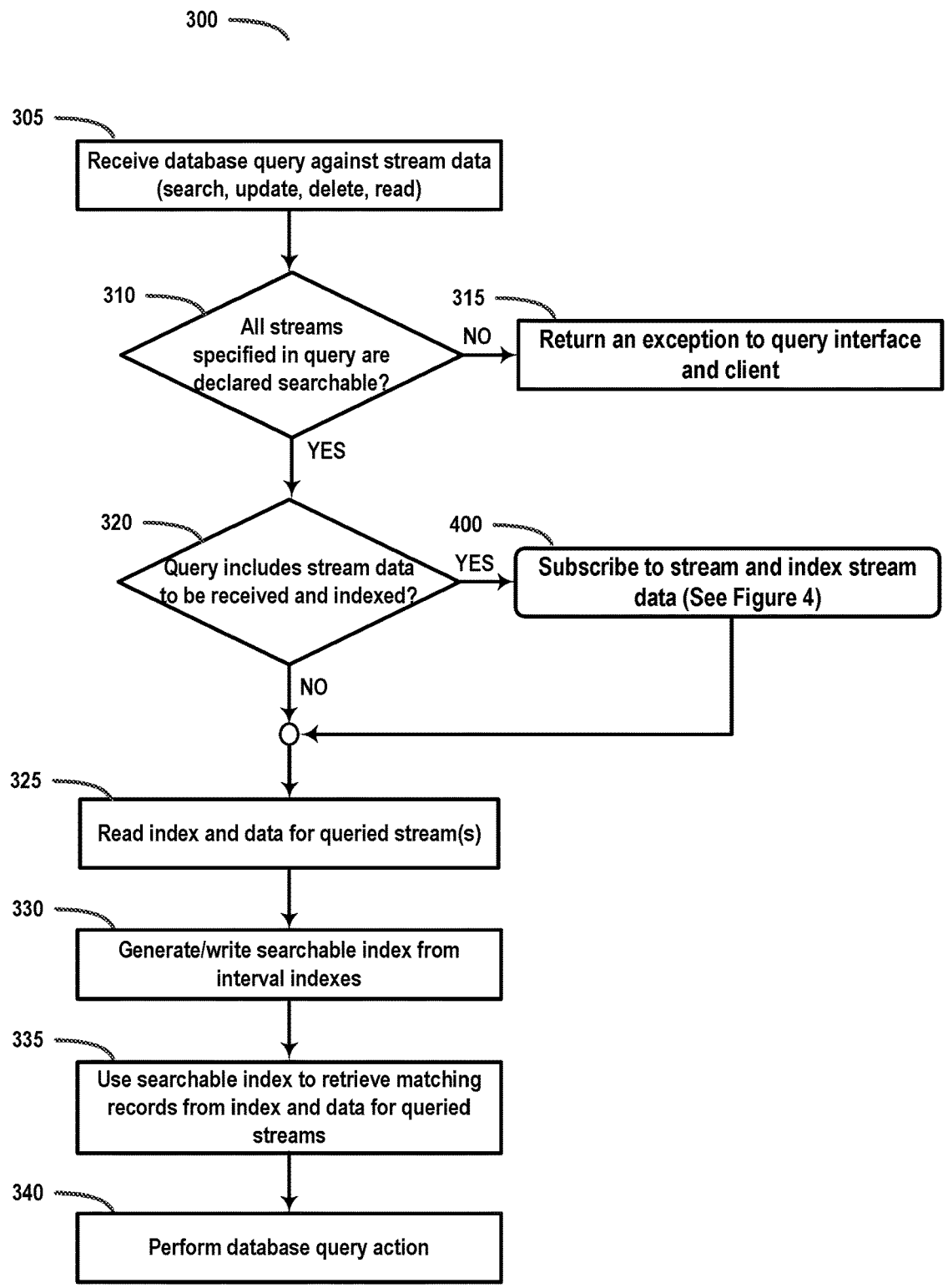
FIG. 3 illustrates a method of efficiently indexing a data stream and generating a full-text search index from the indexed data stream, in accordance with some embodiments.

FIG. 3 illustrates a method 300 of efficiently processing a query against one or more data streams specified in the query, in a streaming service 150, in accordance with some embodiments.

In operation 305, streaming service 150 query interface 170 can receive a query from a client device 130. The query can specify one more data stream indexes in the streaming service 150 upon which to perform a database action. A database action can include update stream data, mark stream data for deletion, search stream data, and read stream data.

In operation 310, it can be determined whether all streams indicated within the client 130 query are declared as searchable within the streaming service 150. In an embodiment, query processor 172 can use query API 175 to call indexer API 165. Indexer API 165 can access stream database 181 to determine whether streams indicated within client 130 query are declared as searchable within the streaming service 150. If a stream has already been registered with index register 174, then query processor 172 can access index register 174 to determine whether a stream indicated in a query has been declared searchable within the streaming service 150. A stream that has been declared as searchable will either already have been indexed, or can be indexed by indexer 160. Indexer API 165 can return a notification to calling query API 175, indicating whether all any streams indicated in the query are not declared as searchable. If, in operation 310 it is determined that any streams indicated in the client 130 query are not declared as searchable within the streaming service 150, then in operation 315 an exception can be returned to the query processor 170 and to the client 130, and method 300 ends. Otherwise, method 300 continues at operation 320.

In operation 320, it can be determined whether the query references stream data to be received and indexed. Stream data to be received can comprise stream data 120 for which stream processor 155 can generate a message queue 157 and the message queue 157 can generating log data records for indexing and storage in the stream service 150. If the query includes stream data to be received and indexed, then in operation 400, stream processor 155 can subscribe to stream data 120, generate a message queue 157 for stream data 120, and process the stream data 120 to generate an indexed stream data file 185 for the stream. Subscribing to a stream and indexing the stream is described in detail below with reference to FIG. 4. Method 300 continues at operation 325.

In operation 325, query processor 172 can read each indexed stream data file 185 for the time intervals specified in the client 130 query. As each time interval of the indexed stream data file 185 is read, the index is merged with any previous intervals.

In operation 330, when all specified time intervals of the indexed data file 185 have been read, and their respective indexes merged into a single index, then query processor 172 can finalize the merged index into a full-text search index 190 for the stream. In an embodiment, finalizing the full-text search index 190 for the stream includes the merging of the index for each interval in an ordered manner, using a sort or merge tool such as mergesort, quicksort, B–Tree, binary, or B+Tree. The full-text search index 190 for the stream can refer directly to the underlying data records that are indexed by the full-text search index 190. In an embodiment, query processor 172, or query API 175, can merge the full-text search indexes 190 for all streams specified in the client 130 query into a single full-text search index 190 for the query.

In operation 335, query processor 172 can use the full-text search index 190 for each stream, or the merged full-text search indexes 190 of all streams indicated within the query, to retrieve records from the specified streams that match the query criteria.

In operation 340, query processor 172 can perform the database query action as specified in the client 130 query in operation 305.

Figure 4:
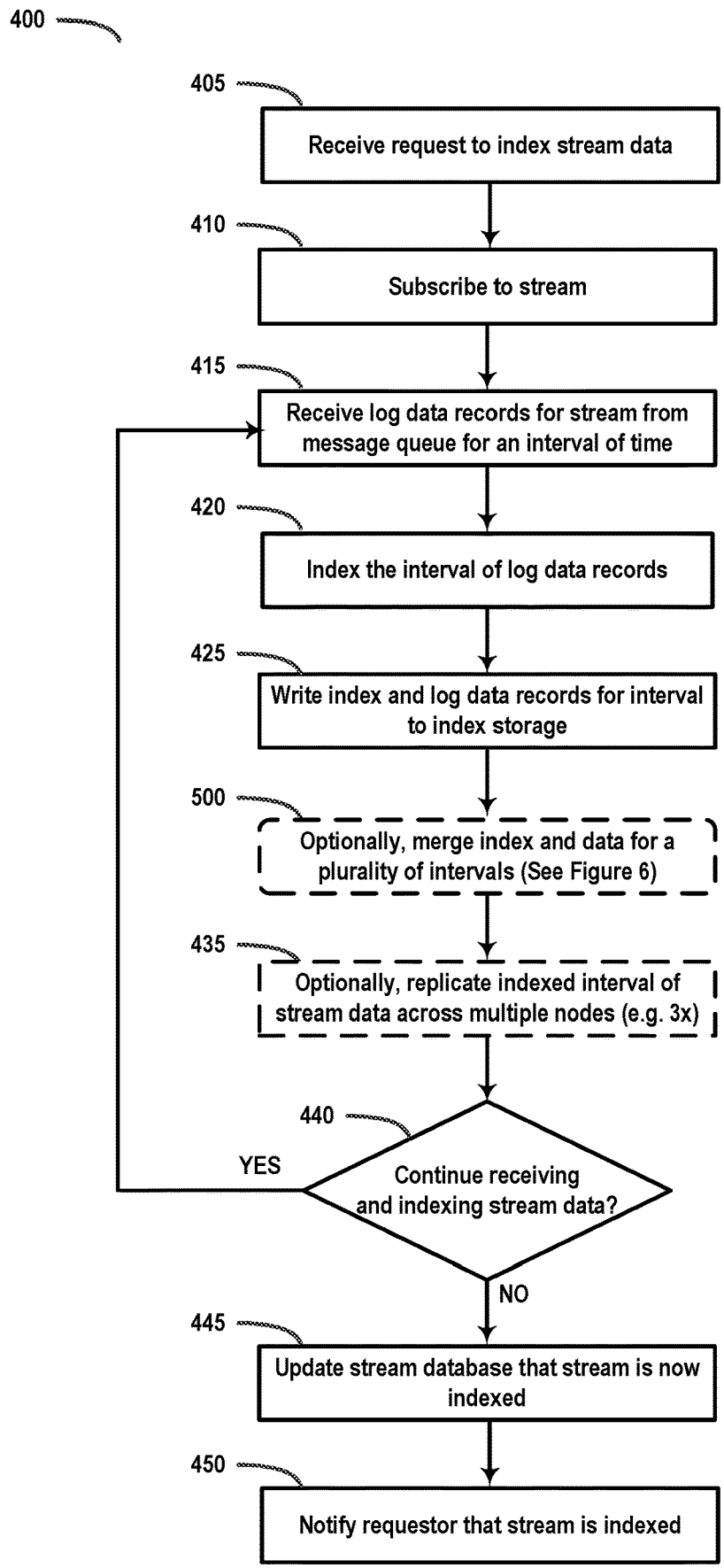
FIG. 4 illustrates a method of efficiently indexing a data stream as the data stream is ingested by a streaming service, in accordance with some embodiments.

FIG. 4 illustrates a method 400 of efficiently indexing a data stream 120 as the data stream is ingested by a streaming service 150, in accordance with some embodiments.

In operation 405, indexer 160 can receive a request to index data stream 120. In an embodiment, the request can be triggered by a client 130 query to query interface 170, wherein the query specifies the stream to index, and a subsequent call by query processor 172, via query API 175, to indexer 160 to index stream data 120 specified in the query.

In operation 410, indexer 160 can subscribe to the data stream 120. In an embodiment, indexer 160 can generate a record in stream database 181 indicating identifying information about the data stream 120, and that the indexer 160 is generating an indexed stream data file 185 for this data stream 120.

In operation 415, stream processor 155 can generate a message queue 157 to receive data from data stream 120, and to generate log data file records in the message queue 157 from the stream data 120 records. Indexer 160 can receive log data file records from message queue 157 for a predetermined interval of time. In an embodiment, the predetermined interval of time is 1 second.

In operation 420, indexer 160 can index the log data file records received from the message queue 157 for the data stream 120 for the interval. In an embodiment, the index comprises terms found in the log data records in the interval. In an embodiment, the index can be self-referential, i.e., the index can reference the index terms within the log data records by pointer, or other reference, rather than including the text of the terms in the index. In an embodiment, the index can be an inverted index of terms found in the log data records for the interval.

In operation 425, indexer 160 can write the index for the interval, and the log data records for the interval, to the indexed stream data file 185.

In operation 500, indexer 160 can optionally perform a merge operation for a plurality of indexed intervals of stream data. A merge operation 500 is described in detail below, with respect to FIG. 5.

In operation 435, indexer 160 can optionally replicate indexed stream data file 185 across multiple nodes in the stream service 150 cluster. In an embodiment, the replication operation 435 can alternatively be performed after finishing the indexing of the stream, on the "NO" branch of operation 440. In an embodiment, replication across a plurality of nodes can be performed using a plurality of operating system "copy" commands that copy the indexed stream data file 185, in its current state, to nodes of the cluster.

In operation 440, it can be determined whether indexer 160 should continue receiving and indexing stream data for more intervals of time. In an embodiment wherein the stream is being indexed in response to a query against the stream data for a specified period of time, indexing can stop when the specified period of stream data has been indexed. In an embodiment, indexer 160 can write the indexed stream data file for the period specified in the query, then continue indexing more of the data stream. If it is determined that indexer 160 should continue receiving and indexing stream data for the current stream, then method 400 continues at operation 415. Otherwise, method 400 continues at operation 445.

In operation 445, indexer 160 can notify the query processor 172 that the requested indexing operation for the requested stream has been completed.

Figure 5:
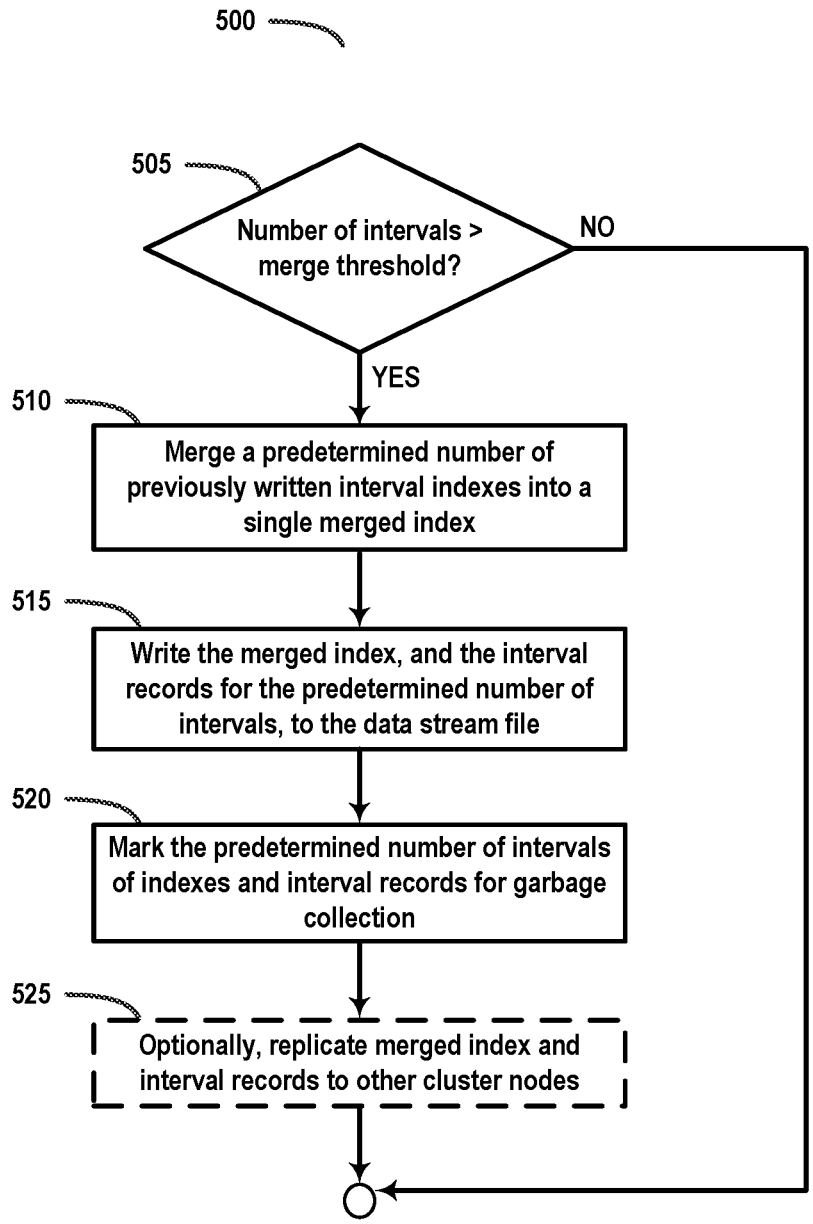
FIG. 5 illustrates a method merging indexes and data of a plurality of intervals of index and data of a data stream, in accordance with some embodiments.

FIG. 5 illustrates a method 500 merging indexes and data of a data stream, in accordance with some embodiments.

In operation 505, it can be determined whether a number of intervals (a merge threshold) of index and log data records that have been written to the indexed stream data file 185 is greater than a merge threshold number of intervals. In an embodiment, the merge threshold number of intervals can be 10 intervals of index and log data records having been written to the indexed stream data file 185. If, in operation 505, it is determined that it is time to do a merge operation, then method 500 continues at operation 510, otherwise method 500 ends.

In operation 510, the indexes of the predetermined number of intervals can be merged into a single merged index. In an embodiment, the indexes for the predetermined number of intervals can be merged using mergesort, quicksort, B-Tree, binary tree, or other index generating method. In an embodiment wherein the intervals are each 1 second in during, and the threshold for merging is 10 intervals, then the merged index and data records interval will be 10 seconds of stream data. Merging can be iterative. If indexer 160 has merged a threshold number of intervals, for a second threshold number of times, then the merged indexes may be merged into a larger merged index for the second threshold number of merged indexes.

In operation 515, the merged index and the predetermined number of intervals of stream data, each having a plurality of log data records, can be written to the indexed stream data file 185. Indexer 160 can write the merged index, and the plurality of merged intervals of log data records, to indexed stream data file 185.

In operation 520, indexer 160 can mark for deletion the previously written indexes and log data records, that were used to generate the merged index In operation 525, the indexed stream data file 185, including the merged index and intervals of log data records, can optionally be replicated across multiple nodes of the streaming service 150 cluster.

Figure 6:
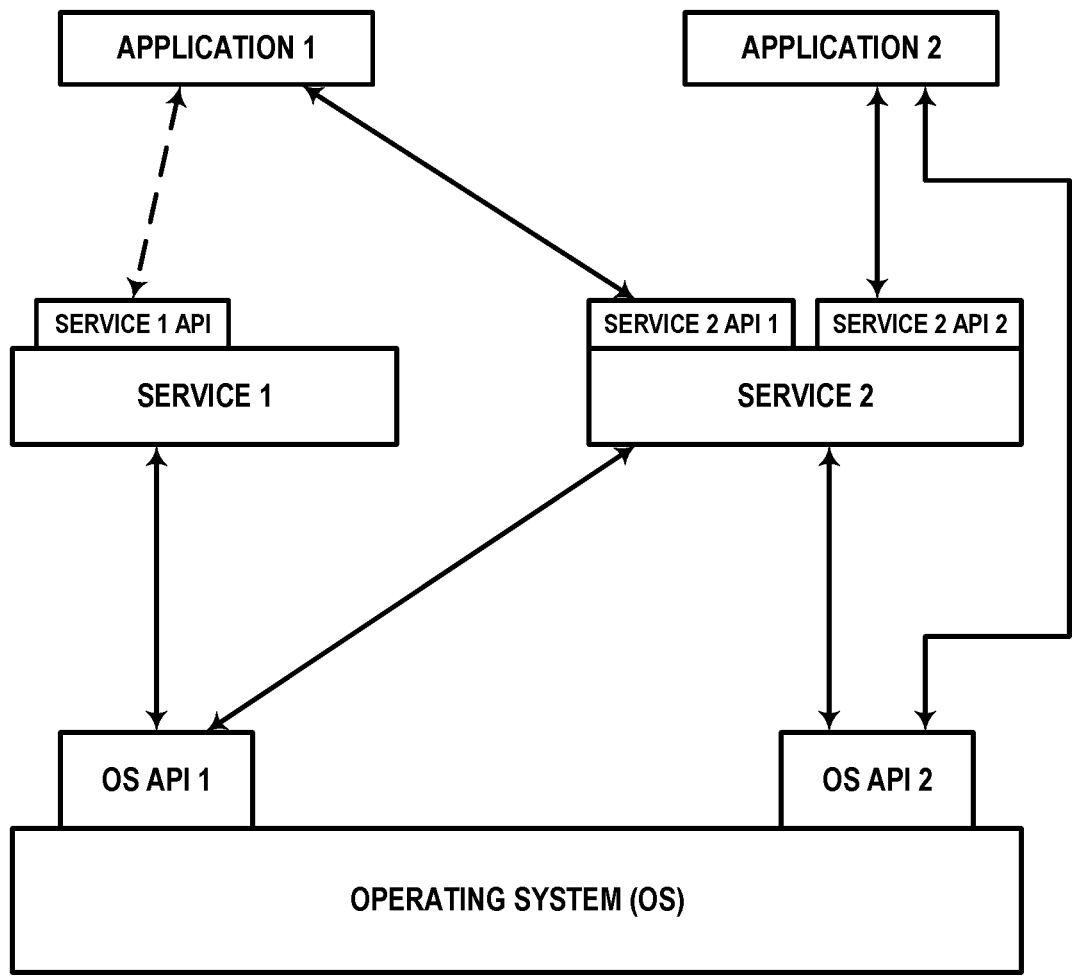
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 7:
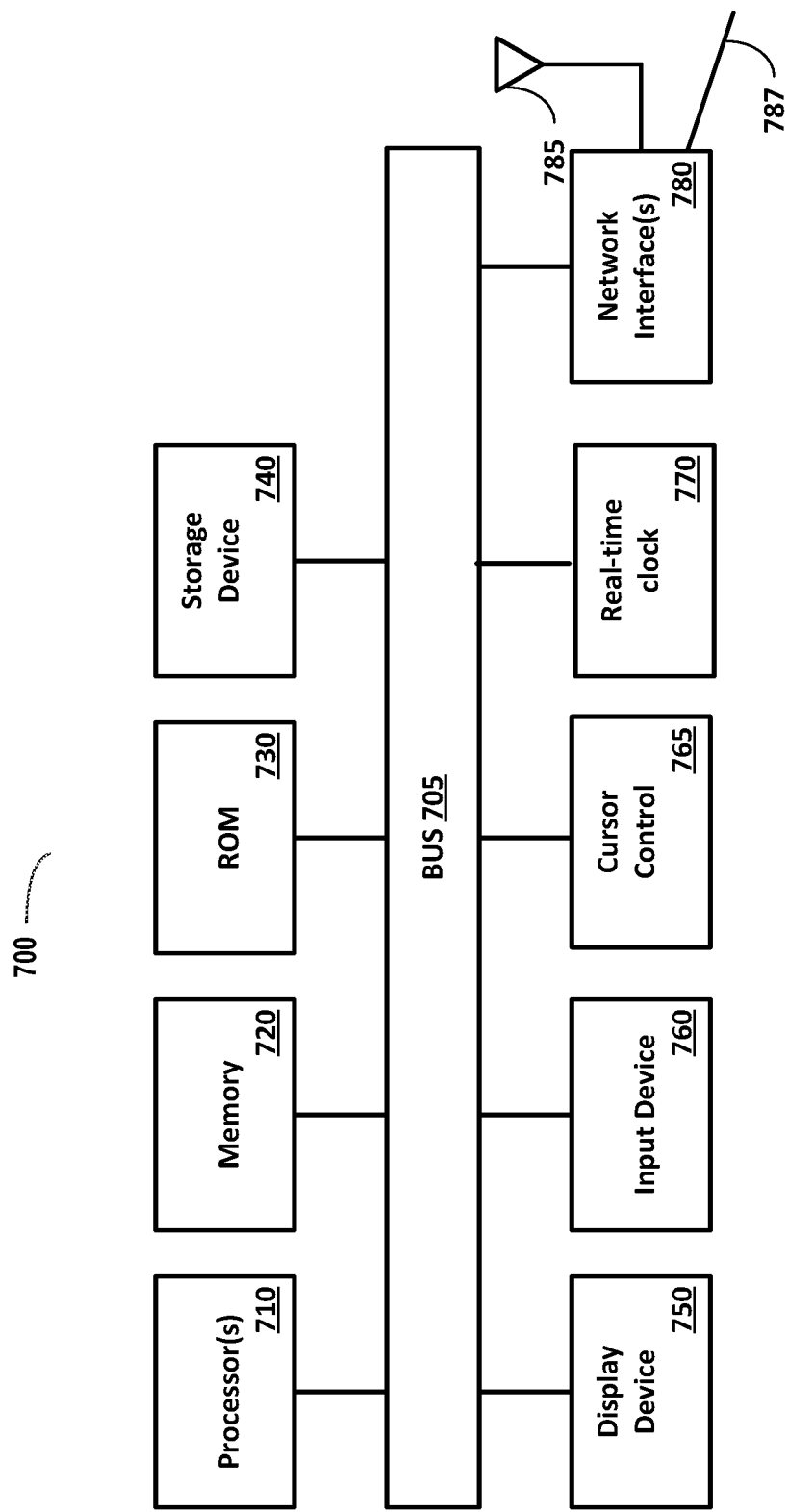
FIG. 7 illustrates an exemplary computing platform for client devices, cluster nodes, and other processing systems that implement the indexing functionality disclosed herein, in accordance with some embodiments.

FIG. 7 is a block diagram of one embodiment of a computing system 700 for client devices, streaming service cluster nodes (storage units, back plane, or processing unit), and other processing systems that implement the virtual stream functionality disclosed herein, in accordance with some embodiments. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a light-emitting diode display (LED), touchscreen, or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method performed by a server, for efficiently generating a full-text search index for a data stream of records, the method comprising:
for each of a plurality of predetermined intervals of time:
receiving a plurality of data stream records;
generating an index of terms for the plurality of data stream records for the interval;
writing the index of terms for the plurality of data stream records for the interval, and the plurality of data stream records for the interval, into a single file termed an indexed data stream file;
in response to determining that the data stream records for a threshold number of predetermined time intervals have been indexed, generating the full-text search index for the plurality of time intervals by merging the index of terms from one or more of the plurality of intervals of time in the indexed data stream file in an ordered manner.

2. The method of claim 1, wherein the index of terms for each of the plurality of intervals of time is generated in response to receiving a database query for the data stream of records.

3. The method of claim 1, wherein the full-text search index is generated in response to a database query containing a database action, the method further comprising:
performing the database action against the data stream of records for a subset of the intervals of time, in accordance with the query.

4. The method of claim 3, wherein the database action comprises one of: search, update, read, or delete.

5. The method of claim 1, wherein the index of terms for each interval in the plurality of intervals references the terms in the plurality of data stream records indexed for the interval by a pointer.

6. The method of claim 1, further comprising:
after a predetermined number of intervals of time:

merging the indexes from the indexed data streams files in the predetermined number of intervals, thereby generating a merged index for the predetermined number of intervals;

writing the merged index and the plurality of records from each of the indexed data stream files in the predetermined number of intervals into a single file containing the merged index and the plurality of records from each of the indexed data stream files in the predetermined number of intervals; and marking for deletion, the indexed data stream file for each interval of the predetermined number of intervals.

7. A non-transitory computer readable medium, programmed with executable instructions that, when executed by a processing system, perform operations for efficiently generating a full-text search index for a data stream of records, the operations comprising:

for each of a plurality of predetermined intervals of time:
receiving a plurality of data stream records;
generating an index of terms for the plurality of data stream records for the interval;
writing the index of terms for the plurality of data stream records for the interval, and the plurality of data stream records for the interval, into a single file termed an indexed data stream file;

in response to determining that the data stream records for a threshold number of predetermined time intervals have been indexed, generating the full-text search index for the plurality of time intervals by merging the index of terms from one or more of the plurality of intervals of time in the indexed data stream file in an ordered manner.

8. The medium of claim 7, wherein the index of terms for each of the plurality of intervals of time is generated in response to receiving a database query for the data stream of records.

9. The medium of claim 7, wherein the full-text search index is generated in response to a database query containing a database action, the operations further comprising:
performing the database action against the data stream of records for a subset of the intervals of time, in accordance with the query.

10. The medium of claim 9, wherein the database action comprises one of: search, update, index, or delete.

11. The medium of claim 7, wherein the index of terms for each interval in the plurality of intervals references the terms in the plurality of data stream records indexed for the interval by a pointer.

12. The medium of claim 7, the operations further comprising:
after a predetermined number of intervals of time:
merging the indexes from the indexed data stream files in the predetermined number of intervals, thereby generating a merged index for the predetermined number of intervals;
writing the merged index and the plurality of records from each of the indexed data stream files in the predetermined number of intervals into a single file containing the merged index and the plurality of records from each of the indexed data stream files in the predetermined number of intervals; and
marking for deletion, the indexed data stream file for each of the predetermined number of intervals.

13. A processing system, comprising a hardware processor coupled to a memory programmed with executable instructions, that when executed by the processing system, perform operations for efficiently generating a full-text search index for a data stream of records, the operations comprising:

for each of a plurality of predetermined intervals of time:
receiving a plurality of data stream records;
generating an index of terms for the plurality of data stream records for the interval;
writing the index of terms for the plurality of data stream records for the interval, and the plurality of data stream records for the interval, into a single file termed an indexed data stream file;

in response to determining that the data stream records for a threshold number of predetermined time intervals have been indexed, generating the full-text search index for the plurality of time intervals by merging the index of terms from one or more of the plurality of intervals of time in the indexed data stream file in an ordered manner.

14. The system of claim 13, wherein the index of terms for each of the plurality of intervals of time is generated in response to receiving a database query for the data stream of records.

15. The system of claim 13, wherein the full-text search index is generated in response to a database query containing a database action, the operations further comprising:
performing the database action against the data stream of records for a subset of the intervals of time, in accordance with the query.

16. The system of claim 15, wherein the database action comprises one of: search, update, index, or delete.

17. The system of claim 13, wherein the index of terms for each interval in the plurality of intervals references the terms in the plurality of data stream records indexed for the interval by a pointer.

18. The system of claim 13, the operations further comprising:
after a predetermined number of intervals of time:
merging the indexes from the indexed data stream files in the predetermined number of intervals, thereby generating a merged index for the predetermined number of intervals;
writing the merged index and the plurality of records from each of the indexed data stream files in the predetermined number of intervals into a single file containing the merged index and the plurality of records from each of the indexed data stream files in the predetermined number of intervals; and
marking for deletion, the indexed data stream file for each of the predetermined number of intervals.

* * * * *